United States Patent
Mayer

(10) Patent No.: US 11,654,965 B2
(45) Date of Patent: May 23, 2023

(54) METHOD AND SYSTEM FOR STEERING CONTROL DURING REVERSE VEHICLE OPERATION FOR MANEUVERING OF A TRAILER

(71) Applicant: Robert Bosch GmbH, Stuttgart (DE)

(72) Inventor: Philipp Oliver Mayer, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 16/910,712

(22) Filed: Jun. 24, 2020

(65) Prior Publication Data
US 2021/0403087 A1    Dec. 30, 2021

(51) Int. Cl.
| | |
|---|---|
| B60R 11/00 | (2006.01) |
| B62D 15/02 | (2006.01) |
| B60R 1/00 | (2022.01) |
| B60R 11/04 | (2006.01) |

(52) U.S. Cl.
CPC .............. *B62D 15/025* (2013.01); *B60R 1/00* (2013.01); *B60R 11/04* (2013.01); *B62D 15/027* (2013.01); *B60R 2300/806* (2013.01)

(58) Field of Classification Search
CPC ...... B62D 15/025; B62D 15/027; B60R 1/00; B60R 11/04; B60R 2300/806
See application file for complete search history.

(56) References Cited

U.S. PATENT DOCUMENTS

| | | |
|---|---|---|
| 7,496,436 B2 | 2/2009 | Galkowski et al. |
| 8,321,091 B2 | 11/2012 | Chung et al. |
| 9,610,974 B2 | 4/2017 | Herzog et al. |
| 9,868,328 B2 | 1/2018 | Kortesalmi |
| 10,046,803 B2 | 8/2018 | Singh et al. |
| 2004/0021291 A1* | 2/2004 | Haug ............... B60T 8/1708 280/455.1 |

(Continued)

OTHER PUBLICATIONS

Cheng et al., "Curve Path Tracking Control for Tractor-Trailer Mobile Robot", Eight International Conference on Fuzzy Systems and Knowledge Discovery, 2011, pp. 502-506.

(Continued)

*Primary Examiner* — Zhihan Zhou
(74) *Attorney, Agent, or Firm* — Michael Best & Friedrich LLP

(57) ABSTRACT

A system and method are provided for steering control during vehicle reverse operation when maneuvering a trailer in a reverse direction with a desired turn angle. The system has a P-I-D cascade structure and includes a rear video camera for providing images to determine a trailer angle, a yaw angle determination device, a steering angle sensor, a vehicle interior display with an input device, and a vehicle speed determination device. When a trajectory mode is selected and a desired turn angle value are received, an electronic processor determines a trailer trajectory based on the desired turn angle value, the trailer angle, vehicle yaw angle, and physical properties of the vehicle and trailer. The trailer trajectory is displayed on the vehicle interior display with the rear camera image. When a driver selects an automatic steering maneuver mode, the trailer tow assist system automatically controls steering of the vehicle.

10 Claims, 9 Drawing Sheets

(56) References Cited

U.S. PATENT DOCUMENTS

| | | | |
|---|---|---|---|
| 2014/0085472 A1* | 3/2014 | Lu | B60R 1/00 |
| | | | 348/148 |
| 2014/0200759 A1* | 7/2014 | Lu | G06T 7/246 |
| | | | 701/28 |
| 2016/0257341 A1* | 9/2016 | Lavoie | B60W 30/18036 |
| 2019/0042864 A1 | 2/2019 | Pliefke et al. | |
| 2019/0337344 A1* | 11/2019 | Yu | B62D 13/06 |
| 2019/0375450 A1* | 12/2019 | Medagoda | B62D 15/0285 |
| 2020/0001922 A1 | 1/2020 | Yamamoto et al. | |
| 2020/0097021 A1* | 3/2020 | Carpenter | G05D 1/0225 |
| 2020/0164919 A1* | 5/2020 | Cotter | B62D 15/025 |
| 2021/0061281 A1* | 3/2021 | Niewiadomski | B60W 50/14 |
| 2021/0070362 A1* | 3/2021 | Xu | B62D 15/025 |
| 2022/0161853 A1* | 5/2022 | Ramirez Llanos | G06V 20/586 |

OTHER PUBLICATIONS

Evestedt et al., "Path tracking and stabilization for a reversing general 2-trailer configuration using a cascaded control approach", Feb. 2016, 7 pages.

Mills, "Reversing a trailer—tendency to jack-knife", <http://www.mills37.plus.com/Jack-kinfe.pdf>, webpage accessed Jan. 27, 2019, 8 pages.

Nilsson et al., "Trailer Parking Assist (TPA)", Master of Science Thesis—System, Control, and Mechatronics submitted to Chalmers University of Technology, Gothenburg, Sweden, 2013, 36 pages.

Pradalier et al., "A simple and efficient control scheme to reverse a tractor-trailer system on a trajectory", IEEE International Conference on Robotics and Automation, Apr. 2007, pp. 2208-2214.

Ridley et al., "Load Haul Dump Vehicle Kinematics and Control", Transactions of ASME, vol. 125, Mar. 2003, pp. 54-59.

Vejlupek, "Trailer Parking Assistant: Upgrade for current parking assistant control units", Proceedings of the 16th International Conference on Mechatronics, Brno, Czech Republic, Brno University of Technology, Extract of dissertation, Jan. 26, 2015, 6 pages.

* cited by examiner

METHOD AND SYSTEM FOR STEERING CONTROL DURING REVERSE VEHICLE OPERATION FOR MANEUVERING OF A TRAILER

BACKGROUND

This arrangement relates to a system and method for providing steering control during vehicle reverse operation when maneuvering a trailer in a reverse direction with turn or the like and sometimes maximizing sharpness of the maneuvering turning movement. In an end position the vehicle and trailer are oriented in alignment.

Maneuvering a trailer can be a hard task for an inexperienced driver. In addition to the fact that a trailer must be actively stabilized in backwards movement, the steering is not intuitive. To correct the drift of a trailer to one side, the driver must steer in this direction to maneuver it back to the center. The embodiments herein support a driver in maneuvering a trailer.

SUMMARY

One embodiment is directed to a trailer tow assist system for assisting in rearward maneuvering of a trailer attached to a vehicle. The trailer tow assist system includes a rear video camera for providing a rearward image of the trailer and surroundings; a vehicle interior display and an input device for selectively displaying a rearward image from the rear video camera, and the input device configured to receive inputs from a driver; a yaw determination device for sensing a yaw angle of the vehicle; a steering angle sensor for sensing a vehicle steering angle of front wheels of the vehicle; a vehicle speed determination device for determining a vehicle speed of the vehicle; and an electronic processor and a memory. When a trajectory mode and a desired turn angle value are received from a driver, the electronic processor is configured to: receive a yaw angle for the vehicle; determine a trailer angle for the trailer relative to the vehicle based upon video data received from the rear video camera; determine a trailer trajectory based on the desired turn angle value, the trailer angle, vehicle yaw angle, and physical properties of the vehicle and trailer; and display the trailer trajectory on the vehicle interior display with the rearward image of the trailer and surroundings. When an automatic steering maneuver mode is selected by a driver, the electronic processor is configured to: provide an initial vehicle steering angle signal to a vehicle steering wheel position controller to position the steering angle of the vehicle for performing the trailer maneuvering operation corresponding to the desired turn angle value; upon rearward movement of the vehicle, updating the vehicle steering angle signal based on the desired turn angle value, the trailer angle, the vehicle speed, the vehicle yaw angle, and the physical properties of the vehicle and trailer, and provide the updated vehicle steering angle signal to the vehicle steering wheel position controller to control the vehicle steering angle to achieve the desired turn angle value with the vehicle and the trailer aligned after the maneuvering.

Another embodiment is a method for assisting in rearward maneuvering of a trailer attached to a vehicle with a trailer tow assist system including an electronic processor. The method operates by determining a trailer angle for the trailer relative to the vehicle based upon video data received from a rear video camera; and receiving a yaw angle for the vehicle. In response to inputs from a driver to select a trajectory mode and to select a desired turn angle value for rearwardly maneuvering the trailer, the method operates by determining with the electronic processor a trailer trajectory based on the desired turn angle value, the trailer angle, the vehicle yaw angle, and physical properties of the vehicle and the trailer; and displaying the trailer trajectory on the vehicle interior display with a rear image of the trailer and surroundings. A driver is then capable of positioning the vehicle at an appropriate position for maneuvering the trailer in a rearward direction to a desired location by moving the vehicle and trailer to align the trailer trajectory provided on the vehicle interior display with a desired location.

Another embodiment is directed to a non-transitory computer readable medium including program instructions executed by an electronic processor for assisting in rearward maneuvering of a trailer attached to a vehicle along a trailer trajectory. The electronic processor is configured for determining a trailer angle for the trailer relative to the vehicle based upon video data received from a rear video camera; receiving a yaw angle for the vehicle; receiving a steering angle of front wheels of the vehicle; and receiving a vehicle speed of the vehicle. The electronic processor performs a trailer steering maneuver along the trailer trajectory corresponding to a desired turn angle value by: determining an initial vehicle steering angle signal based on the desired turn angle value, the trailer angle, the vehicle yaw angle, and physical properties of the vehicle and the trailer; providing an initial vehicle steering angle signal to a vehicle steering wheel position controller to position the steering angle of the vehicle for performing the trailer steering maneuver corresponding to the desired turn angle value; upon rearward movement of the vehicle, updating the vehicle steering angle signal based on the desired turn angle value, the trailer angle, the vehicle speed, the vehicle yaw angle, and the physical properties of the vehicle and trailer, and providing the updated vehicle steering angle signal to the vehicle steering wheel position controller to automatically control the steering angle of the vehicle to maneuver the trailer along the trailer trajectory to achieve the desired turn angle value with the vehicle and the trailer aligned after the maneuvering.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "units," "control units," and "controllers" described in the specification can include one or more electronic controllers, one or more memories including non-transitory computer-readable media, one or more input/output interfaces, one or more application specific integrated circuits (ASICs) and other circuits, and various connections or connectors (for example, wires, printed traces, and buses) connecting the various components.

Figure 1:
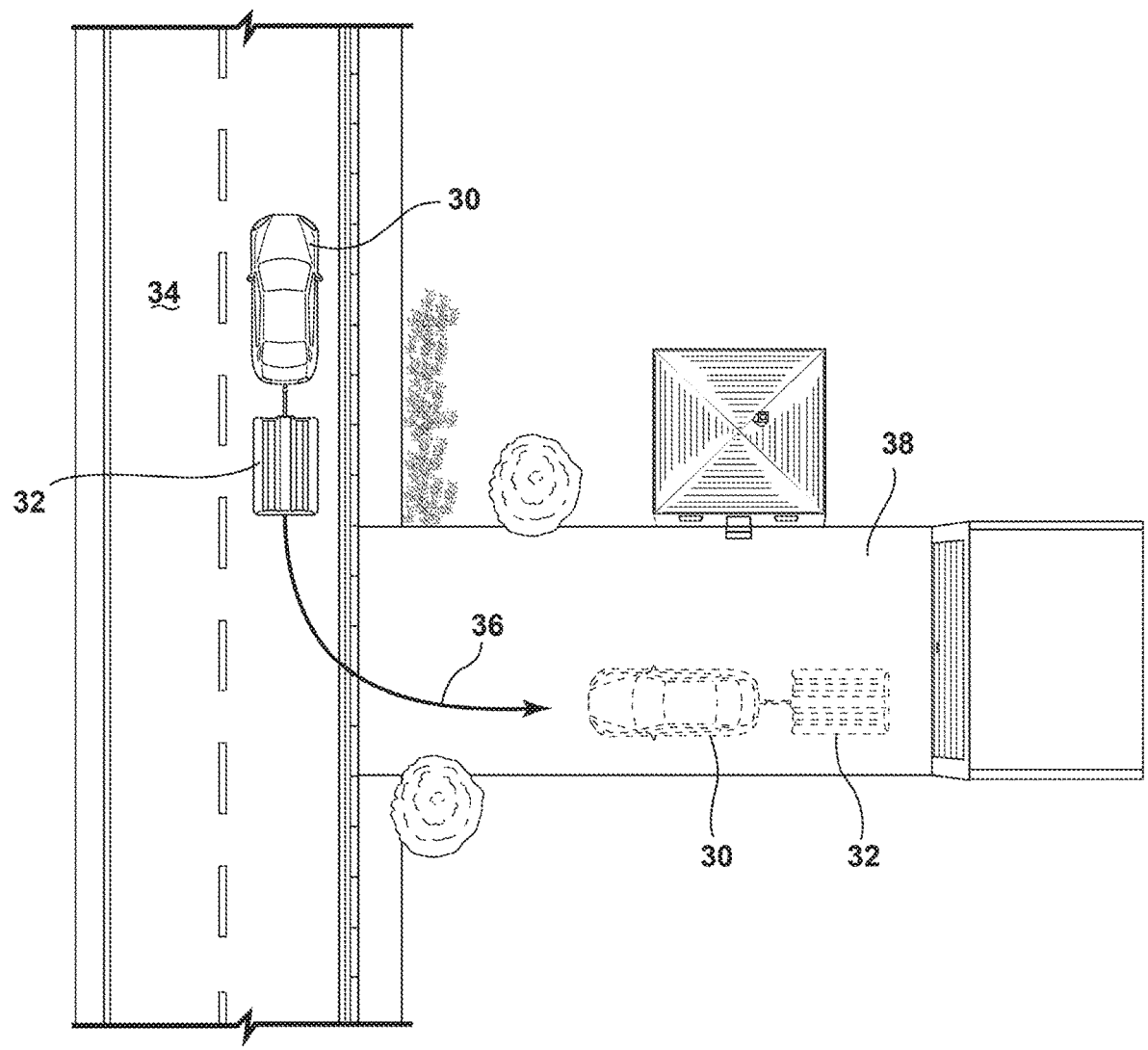
FIG. 1 illustrates a top view of a vehicle and trailer on a roadway and in a rearwardly desired position.

FIG. 1 shows a vehicle 30 and trailer 32 disposed on a roadway 34. From a starting position in the roadway 34, the vehicle 30 moves in a reverse direction path 36 to maneuver the trailer 32 in a driveway 38 with assistance from a trailer tow assist system and a driver operating an accelerator pedal and brake pedal or the like. In this embodiment, the trailer tow assist system controls vehicle steering to move the vehicle 30/trailer 32 combination throughout a 90° backwards turn angle along a trailer trajectory that is a sharpest possible path going rearwardly a shortest possible distance. Other desired turn angle values are contemplated, including a first range between about 10 degrees and about 90 degrees and/or a second range between about −10 degrees and −90 degrees in some embodiments. In one embodiment, the trailer 32 is a common non-steering one-axle trailer. In some embodiments, the trailer 32 has a length from about 1 to about 20 meters. In some embodiments, the sharpest possible path to obtain the desired turn angle is not desired. In most embodiments, a final position for the trailer 32 and the vehicle 30 are provided in a longitudinal orientation. Thus, the trailer 32 and the vehicle 30 are aligned in the same direction of travel.

Figure 2:
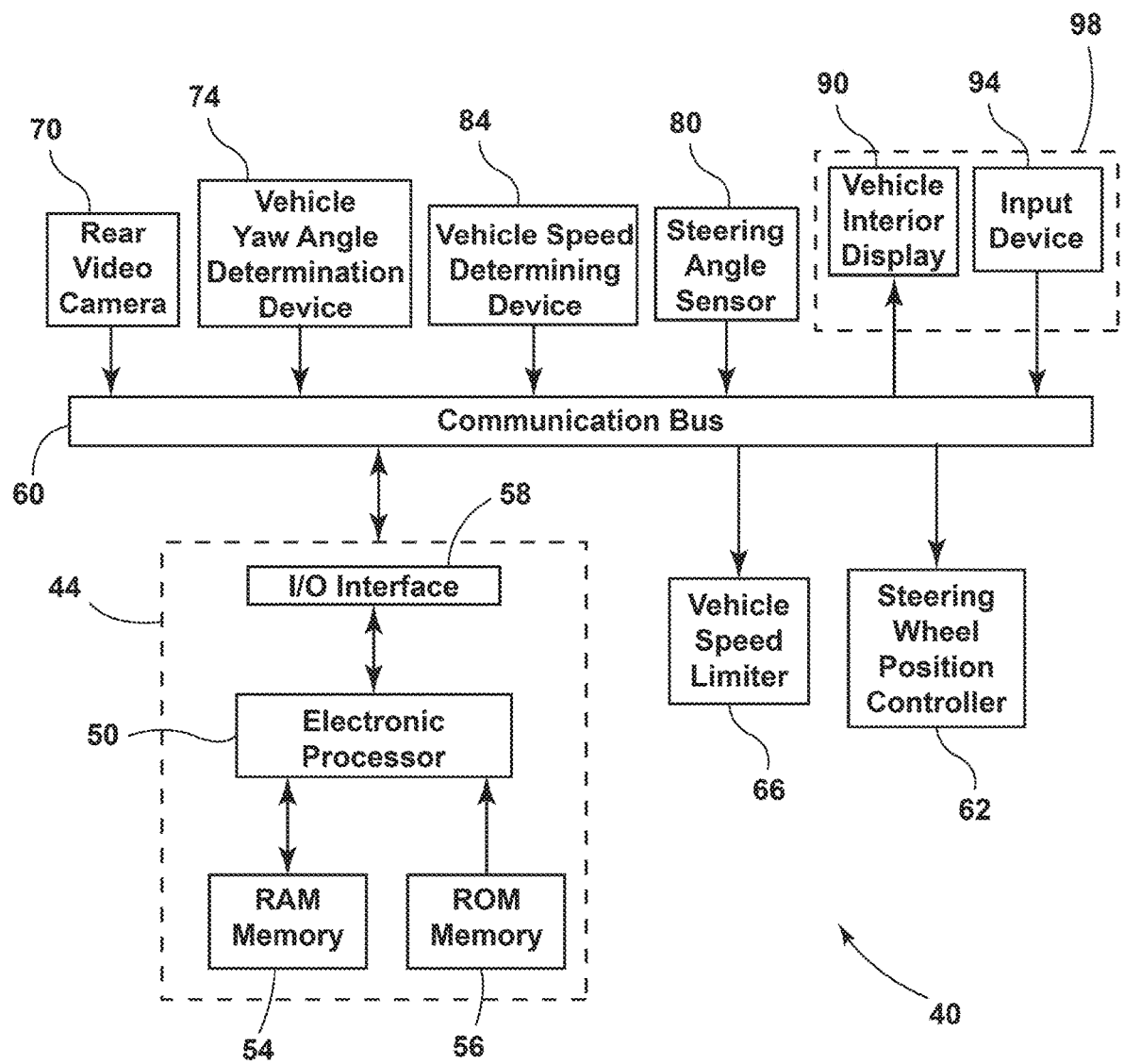
FIG. 2 illustrates a block diagram of one embodiment of a trailer tow assist system for assisting in rearward maneuvering of a trailer.

FIG. 2 shows a block diagram view of a trailer tow assist system 40 for controlling vehicle steering to maneuver a trailer 32. In one embodiment, the trailer tow assist system 40 includes an electronic tow assist unit 44. The electronic tow assist unit 44 includes an electronic processor 50 and a memory. The memory includes one or more memory modules, such as a random access memory ("RAM") 54 and/or an electronically erasable programmable read-only memory ("EEPROM") 56. An input/output interface 58 transmits and receives information over a communication bus 60. The electronic processor 50 processes the information by executing one or more applications or modules. The applications or modules can be stored as instructions or commands in the memory 54, 56. The electronic processor 50 also stores information in the memory 54 generated by applications.

The communication bus 60 shown in FIG. 2 is a FlexRay automotive communication bus, controller area network (CAN) bus or other type of communication link between a plurality of control units, sensors, and other devices. In some embodiments, the communication bus 60 connects the electronic tow assist unit 44 to an electronic steering wheel position controller 62, such as a power steering control motor, that is controlled by the electronic tow assist unit 44 in a trailer tow assist operating mode.

FIG. 2 also shows a vehicle speed limiter 66 that limits speed of a vehicle in an automatic steering maneuver mode. In one embodiment, the vehicle speed limiter 66 is an electronic drive control system of a vehicle that receives an input of a vehicle speed limit signal from the electronic processor 50 from the tow assist system that limits the reverse direction speed for a vehicle to prevent a driver from exceeding the vehicle speed limit for an automatic steering maneuver mode.

FIG. 2 shows a rear video camera 70 for providing images from the rear of a vehicle. The images can include a trailer that is hitched to the vehicle. In one embodiment, the images are a panoramic view. In another embodiment, multiple video cameras are provided. The rear video camera 70 provides video data over the communication bus 60 to the electronic processor 50.

FIG. 2 shows a vehicle yaw angle determination device 74 provided on a vehicle. In one embodiment, the yaw angle determination device 74 includes a gyro sensor that communicates yaw rate to units via the communication bus 60. The yaw rate is integrated to determine a yaw. In another embodiment, the vehicle yaw angle is calculated based on vehicle speed and vehicle steering angle. Thus, the vehicle yaw angle determination device is provided by the electronic processor 50 in one embodiment. The vehicle yaw angle is determined with respect to a starting position for a vehicle maneuver.

A steering angle sensor 80 is connected to the communication bus 60 to provide a steering wheel position to the electronic processor 50 via the input/output interface 58. In one embodiment, the steering angle sensor 80 is disposed on a steering column of the steering device. In another embodiment, the steering angle sensor 80 is configured to sense rotation of a pinion gear secured to a steering shaft of the vehicle. In another embodiment, the steering angle sensor 80 determines steering angle based on motor rotation of the power steering control motor and a ratio with respect to the rack and pinion gear.

In one embodiment, a vehicle speed determination device 84 shown in FIG. 2 determines a vehicle speed and provides the vehicle speed to other units via the communication bus 60. In another embodiment, the vehicle speed determination device 84 is a vehicle speed sensor. In another embodiment, calculations of other information provide vehicle speed.

FIG. 2 shows a vehicle interior display 90 and an input device 94. In one embodiment, the vehicle interior display 90 is a display panel for displaying images and instructions to a driver. The input device 94 is a keyboard, joystick, keypad or other data entry mechanism, such as a microphone and voice analysis to receive voice commands. In one embodiment, the arrangement is a touchscreen 98 that integrates the vehicle interior display 90 and input device 94 into a single element that displays information and images and receives touch inputs. In one embodiment, the touchscreen 98 is disposed at a console in the vehicle interior.

Operation

In operation, the electronic tow assist unit 44 includes a trajectory mode and an automatic steering maneuver mode. The trajectory mode is selected and operated before the automatic steering maneuver mode as follows.

Trajectory Mode.

Figure 3:
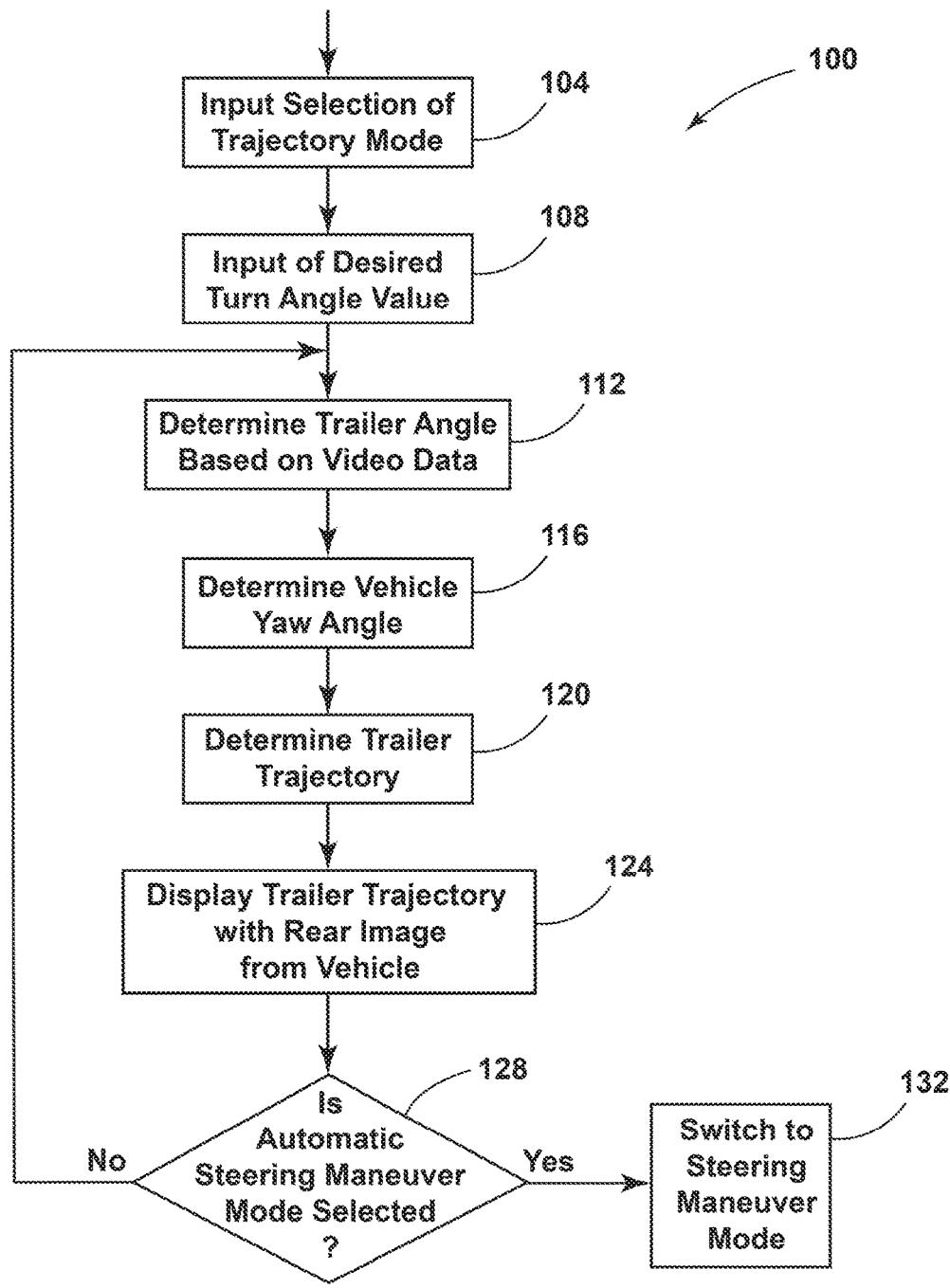
FIG. 3 illustrates a flow chart for an embodiment of a trajectory mode of the tow assist system.

FIG. 3 shows a flow chart 100 of the trajectory mode for the electronic tow assist unit 44 shown in FIG. 2. While a single electronic tow assist unit 44 is shown in FIG. 2, multiple control units and/or electronic processors 50 can perform the various functions shown in FIG. 3. The multiple steps shown in FIG. 3 can occur essentially simultaneously or in parallel with multiple electronic processors of the electronic tow assist unit 44.

At step 104, in one embodiment, a trajectory mode selection is received by the electronic processor 50 from the input device 94 over the communication bus 60. Thereafter, at step 108, the electronic processor 50 also receives a desired turn angle value from the input device 94. The driver can input the desired turn angle value before selecting the trajectory mode in another embodiment. The desired turn angle value can be from 10 degrees to 90 degrees and from −10 degrees to −90 degrees depending on the direction of the desired reverse turn maneuver of the trailer 32.

At step 112 shown in FIG. 3, the electronic processor 50 is configured to determine trailer angle based on video data received from the rear video camera 70 over the communication bus 60. The trailer angle is defined by the relative orientation of the trailer 32 with respect to the vehicle 30. When the vehicle 30 and trailer 32 are aligned along the same axis, for example when the vehicle 30 is driven forward in a straight direction, the trailer angle is zero degrees. After step 112, the electronic processor advances to step 116.

At step 116, the electronic processor 50 receives a yaw angle from the vehicle yaw angle determination device 74 on the vehicle 30. The vehicle yaw angle is determined by integrating the yaw rate signal in one embodiment. The electronic processor 50 advances to step 120.

At step 120, the electronic processor 50 determines a trailer trajectory for the desired turn angle value that is based on the desired turn angle value, the trailer angle, the vehicle yaw angle, and physical properties of the vehicle and trailer. The determination is provided when the vehicle 30 is stationary or being driven by a driver. Thereafter, the electronic processor 50 advances to step 124. Physical properties or parameters of the vehicle and trailer can include vehicle wheelbase, vehicle overhang, trailer length, maximum wheel angle, and maximum wheel angle change rate.

At step 124, the electronic processor 50 displays a trailer trajectory on the vehicle interior display 90 with the rearward image of the trailer 32 and surroundings. The trailer trajectory is superimposed or an overlay on the video image. The electronic processor 50 advances to step 128.

At decision step 128, the electronic processor 50 determines whether a driver input to the input device 94 selecting an automatic steering maneuver mode has been received and the vehicle is in reverse gear and the vehicle is stationary due to application of the brakes. So long as the inputs are not received, decision step 128 returns to step 112 and again determines the trailer angle, vehicle yaw angle, and a trailer trajectory as discussed above. Thus, when the vehicle 30 and trailer 32 are moving, the trailer trajectory is updated to show the new relative position thereof shown in the rearward image of the trailer 32 on the vehicle interior display 90. During operation in the trajectory mode, a driver views the trailer trajectory on the vehicle interior display 90 and manually moves the vehicle 30 and the trailer 32 to a location so that the trailer trajectory for each of the trailer wheels leads to a desired area where the driver intends to maneuver the trailer to.

At decision step 128 when the electronic processor 50 receives an input that the vehicle is not moving, and that a driver has selected the automatic steering maneuver mode, the electronic processor 50 advances to step 132. This selection is made when the driver sees the trailer trajectory directed to a desired trailer location and provides a manual actuation to select the mode with the input device 94. In some embodiments, the vehicle 30 must also be in reverse gear to advance to the automatic steering maneuver mode.

Automatic Steering Maneuver Mode

Figure 4:
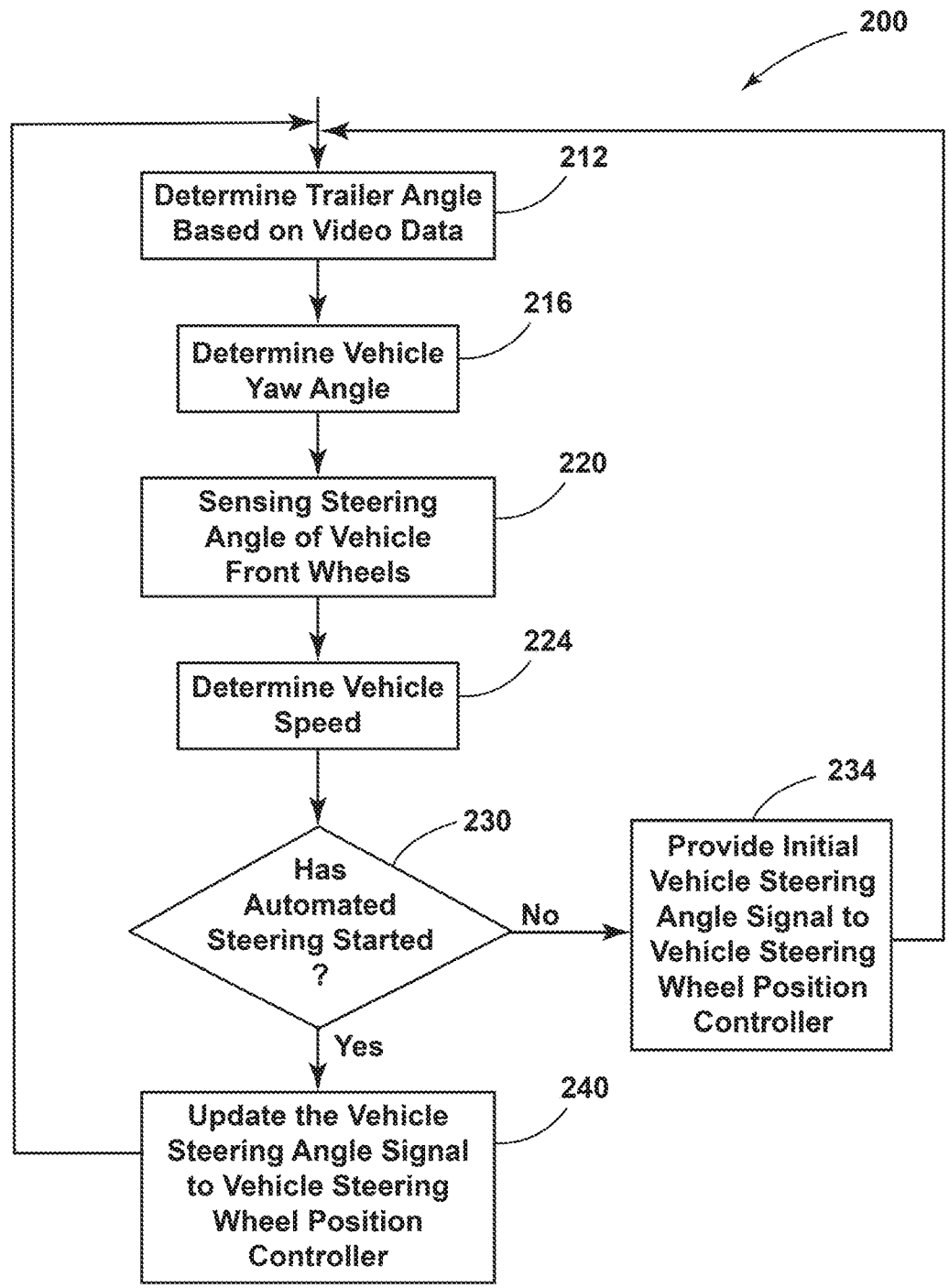
FIG. 4 illustrates a flow chart for an embodiment of an automatic steering maneuver mode of the tow assist system.

FIG. 4 shows a flow chart 200 of the switched to automatic steering maneuver mode corresponding to step 132 shown in FIG. 3. The automatic steering maneuver mode provides automatic vehicle steering to achieve the vehicle maneuvering rearward along the trailer trajectory as follows.

At step 212, the electronic processor 50 is configured to determine trailer angle based on video data received from the rear video camera 70 over the communication bus 60. The trailer angle is defined by the relative position of the trailer 32 with respect to the vehicle 30. After step 212, the electronic processor advances to step 216.

At step 216, the electronic processor 50 receives a vehicle yaw angle from the vehicle yaw angle determination device 74 on the vehicle 30. The vehicle yaw angle is determined by integrating the yaw rate signal in one embodiment. The electronic processor 50 advances to step 220.

At step 220, the electronic processor 50 receives a steering angle for front wheels of the vehicle 30, which is sensed by the steering angle sensor 80 and provided over the communication bus 60. The electronic processor 50 advances to decision step 230.

At decision step 230, the electronic processor 50 determines whether automated steering maneuver mode has already started. If not, the electronic processor 50 advances to step 234. At step 234, the electronic processor 50 provides an initial vehicle steering angle signal to an electronic steering wheel position controller to prepare for reverse operation of the vehicle 30. The initial vehicle steering angle signal is determined to follow a trailer trajectory based on the desired turn angle value, the trailer angle, the vehicle yaw angle, and physical properties of the vehicle 30 and the trailer 32. Thereafter, the electronic processor 50 returns to step 212 and repeats the steps 212, 216, 220, 224.

At decision step 230, when the initial vehicle steering was already provided, the electronic processor advances to decision step 240. At step 240, the vehicle steering angle signal is updated based on the desired turn angle value, the trailer angle, the vehicle speed, the vehicle yaw angle, and the physical properties of the vehicle 30 and the trailer 32. The electronic processor 50 returns and repeats the illustrated steps 212, 216, 220, 224, 230, 240 until the vehicle 30 is removed from reverse gear or otherwise disabled by an input from a driver. In one embodiment, the vehicle trailer tow assist system 40, or at least the automatic steering maneuver mode thereof, is automatically disabled or discontinued when the vehicle 30 is shifted out of reverse gear.

The above steps shown in the embodiments of FIGS. 3 and 4 are provided for purposes of illustration. The steps can occur in an entirely different order.

ADDITIONAL EMBODIMENT(S)

Figure 5:
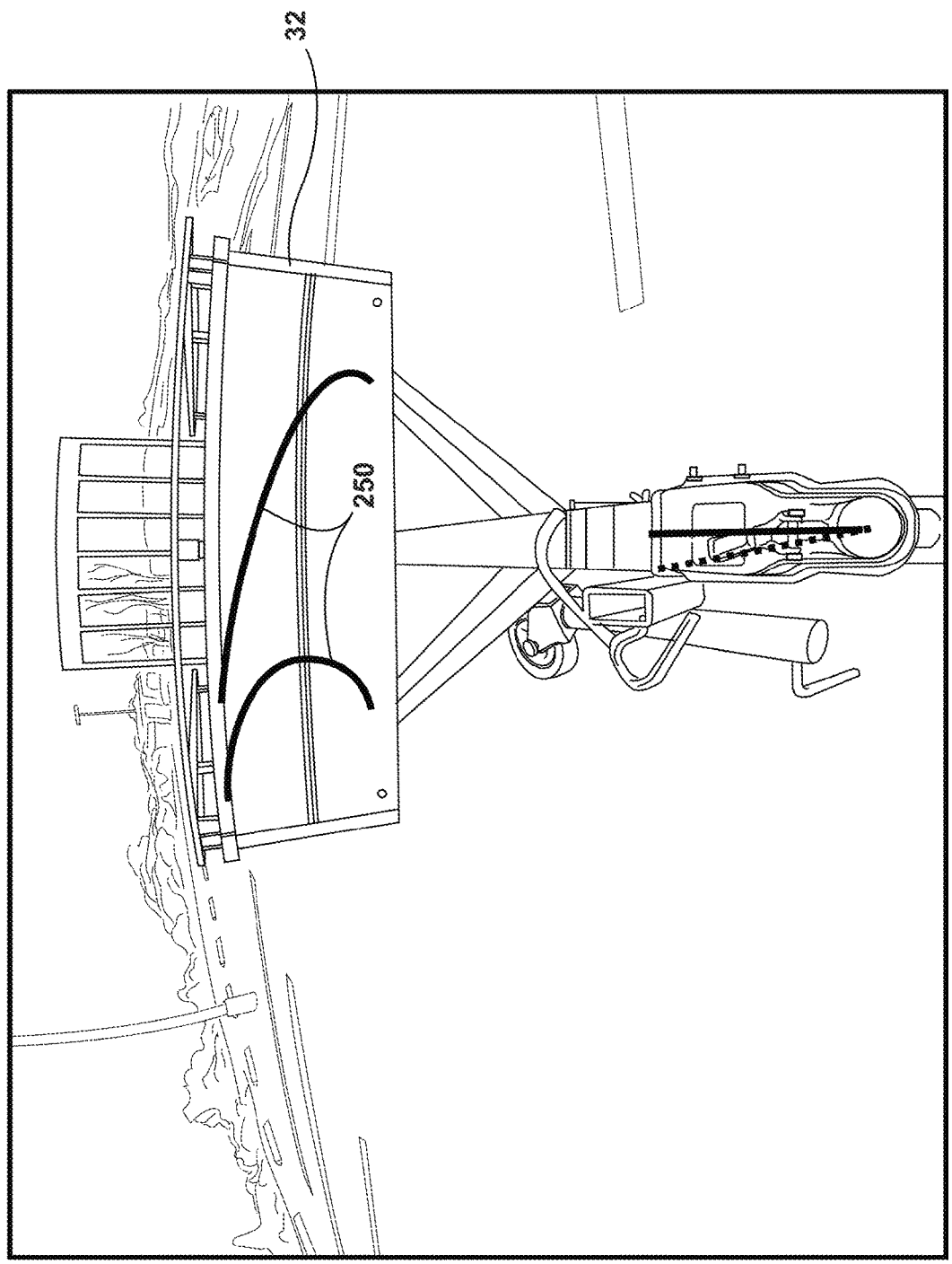
FIG. 5 illustrates an exemplary image for display depicting a trailer trajectory and a trailer with surroundings.

In one embodiment, the trajectory mode shown in FIG. 3 continues to operate and display the trailer trajectory on the vehicle interior display 90 with the rear image of the trailer and surroundings during the automatic steering maneuver mode. FIG. 5 shows an image of the trailer 32 and surroundings. FIG. 5 also shows the trailer trajectory has pathways 250 corresponding to each of the spaced trailer wheels. The image shown in FIG. 5 is updated continuously and provided on the vehicle interior display 90, including continuing to perform the trajectory mode including displaying the trailer trajectory 250 on the vehicle interior display 90 with the rear image of the trailer 32 and surroundings while the electronic processor 50 is automatically controlling the steering angle of the vehicle 30. In another embodiment, the trailer trajectory is a single path corresponding to a midpoint of the trailer 32.

Geometrical Equations

Figure 6:
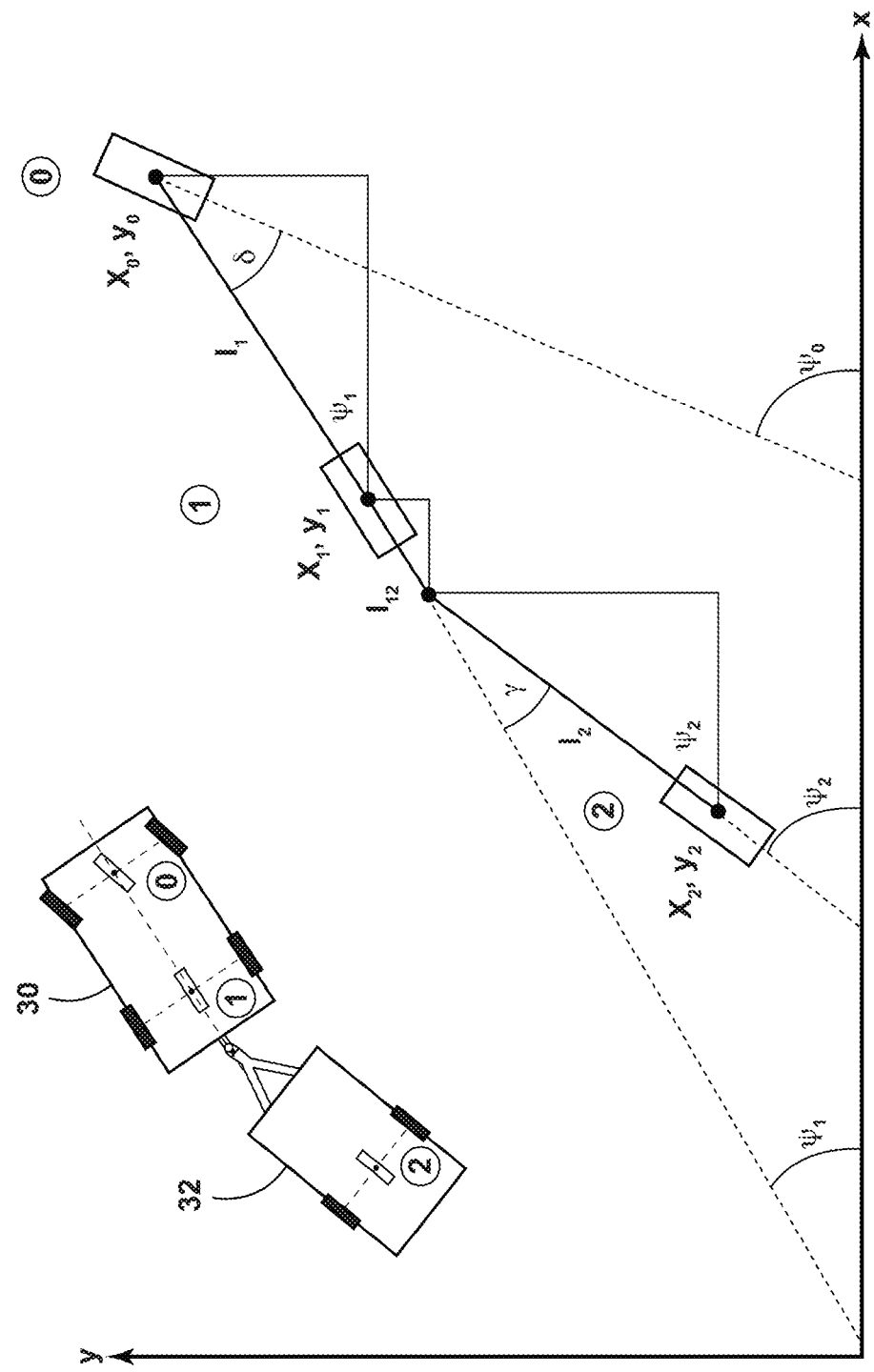
FIG. 6 shows a geometric diagram of a vehicle with a connected trailer.

FIG. 6 shows a geometric diagram of the vehicle 30 with the trailer 32 in combination. Further, FIG. 6 shows one embodiment of the angles for determining the various values for algorithms executed in the operating modes relative to an X-Y axis.

A first equation for trailer angle rate is as follows:

$$\dot{\gamma} = -\left(\frac{v}{l_1} + \frac{v l_{12}}{l_1 l_2}\cos(\gamma)\right)\tan(\delta) - \frac{v}{l_2}\sin(\gamma))$$

The above equation is based on vehicle speed v, trailer angle γ, steering angle δ, vehicle overhang $l_{12}$ (distance from rear axle of the vehicle to trailer ball), vehicle wheelbase $l_1$, and trailer length $l_2$ (distance from hitch to trailer axle). The vehicle yaw rate $\dot{\psi}_1$ is based on the equation as follows:

$$\dot{\psi}_1 = \frac{v}{l_1}\tan(\delta)$$

The above vehicle yaw rate equation is based on steering angle δ, vehicle wheelbase $l_1$ and vehicle speed v. Integration of the yaw rate results in a value for yaw $\psi_1$.

P-I-D Cascade Structure

Figure 7:
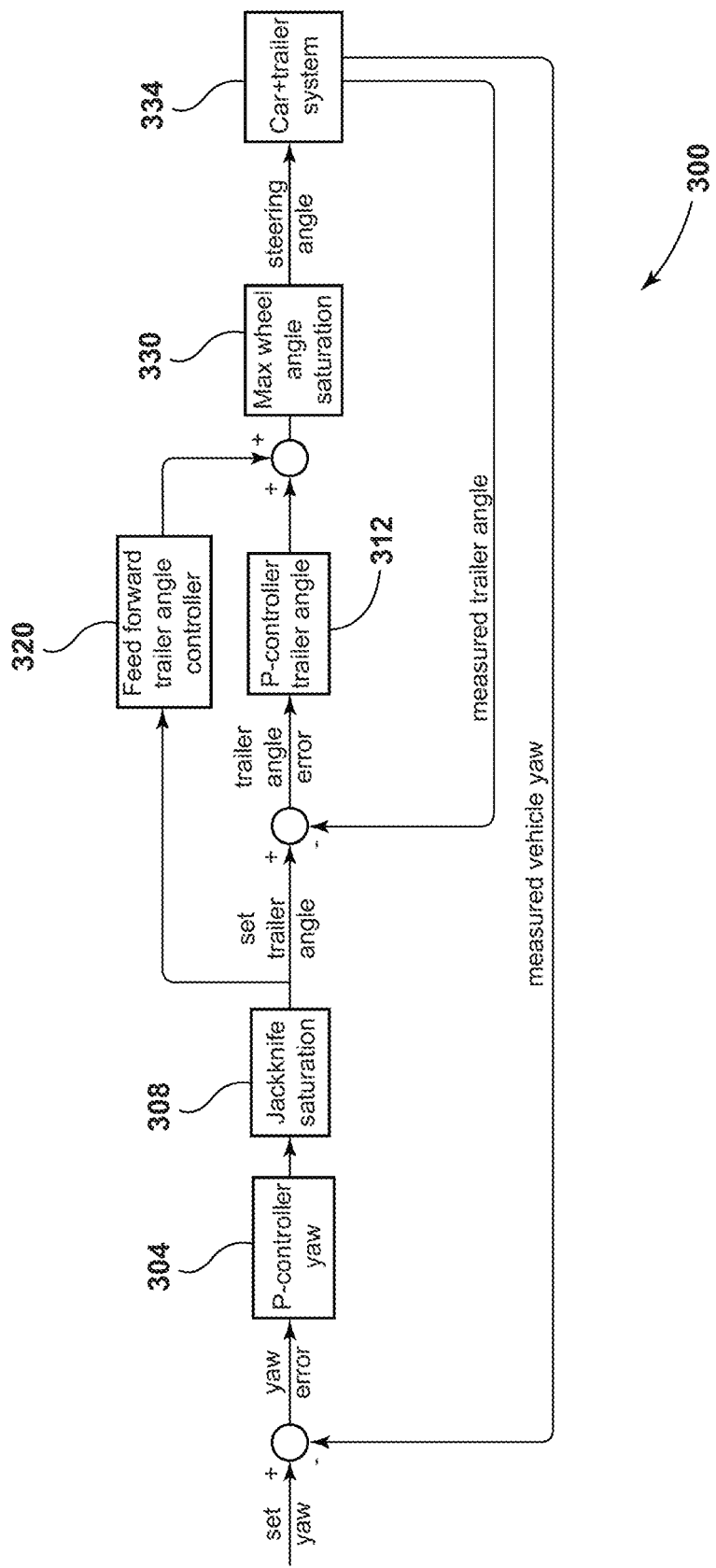
FIG. 7 illustrates a block diagram showing the operation of an electronic processor(s).

FIG. 7 shows a block diagram 300 of an embodiment of the electronic processor 50 of the trailer tow assist system 40 that operates as a proportional/integral/derivative (P-I-D) cascade structure. In this embodiment, a set yaw value corresponding to the desired turn angle value is provided as a set yaw, wherein a trailer angle error is determined in an inner loop and a vehicle yaw angle error is determined in an outer loop, and wherein the trailer angle error is determined more often than the vehicle yaw angle error in one embodiment. In another embodiment, the trailer angle error and the vehicle yaw angle error are determined at the same rate.

The yaw angle value is part of the trailer angle equation. Changing the vehicle yaw angle therefore influences the trailer angle value. The inner loop shown in FIG. 7 operates faster than the outer loop. At a given speed and wheel angle, the change rate of the trailer angle is higher than the one of the vehicle yaw angle.

The PID cascade structure approach shown in FIG. 7 is chosen as a control concept in one embodiment. The trailer angle is processed in the inner loop and the vehicle yaw in the outer loop. By designing a cascade control, the inner loop is required to be stable without the outer loop controller, thus the inner loop shown in FIG. 7 can be operated on its own. Therefore, the first step is to solely develop and tune the inner loop as own controller. Afterwards the system and the inner loop together are considered as the control system for the outer loop.

More specifically, FIG. 7 shows a yaw P-controller 304 that provides a tunable parameter for control. The yaw output=Kyaw_P*(set yaw−measured yaw) is tunable and determines sharpness of the turn and needs to be adjusted for different trailer lengths.

The electronic processor 50 advances to jackknife saturation 308 shown in FIG. 7. Jackknife angles vary with different trailer lengths 12. The jackknife angle provides a maximum value for the permitted yaw angle output to avoid jackknifing of the trailer 32.

The electronic process or 50 advances to P-controller trailer angle 312 that receives a trailer angle error based on the jackknife output angle minus measured trailer angle as shown in FIG. 7. The P-controller trailer angle is a tunable parameter that is stable for a desired operation range. Factors that are tunable include vehicle speed, etc. In one embodiment, gain scheduling occurs.

FIG. 7 shows a feed-forward control 320. The latter part is responsible for a good set-point tracking, whereas the measured feedback of the systems leads to stabilization and error compensation. The feed-forward control 320 calculates the corresponding steady-state vehicle steering angle for a given trailer angle based on a steady-state equation. This wheel angle is added as an offset to the turn angle output from P-controller trailer angle 312 to achieve faster set-point following.

The electronic processor 50 then advances to maximum wheel angle saturation 330 as shown in FIG. 7. The turn angle combined is compared with a maximum wheel angle so that the steering angle provided to the electronic steering wheel position controller 62 in a car-trailer system 334 does not exceed a maximum wheel angle of the vehicle 30. The maximum wheel angle is dependent on properties of the vehicle 30 and trailer 32 as discussed above.

In general, a PID-controller processes the error of the measured variable in comparison to the set point and consists of three terms: The P-term is proportional to the error, the I-term is proportional to the integral of the error, and the D-term is proportional to the derivative of the error. However, not all terms have to be included to get a proper control quality.

Example 1—90 Degree Desired Turn Angle

Figure 8A:
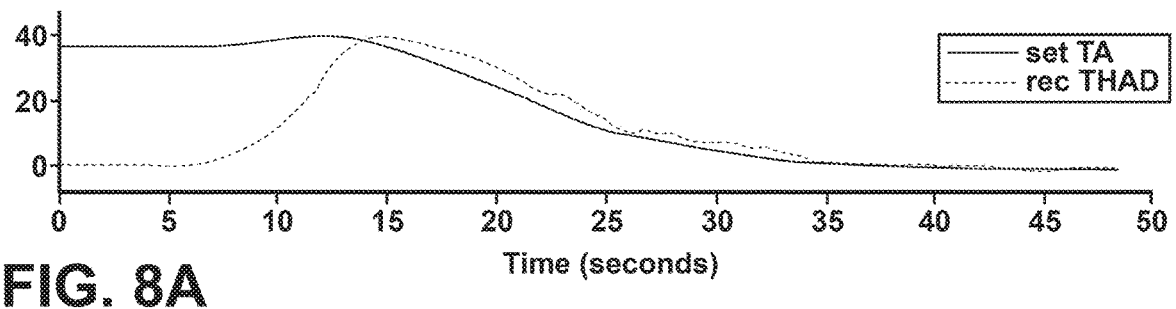
FIGS. 8A-8D illustrate graphs of vehicle data for a desired turn angle of 90 degrees.
Figure 8B:
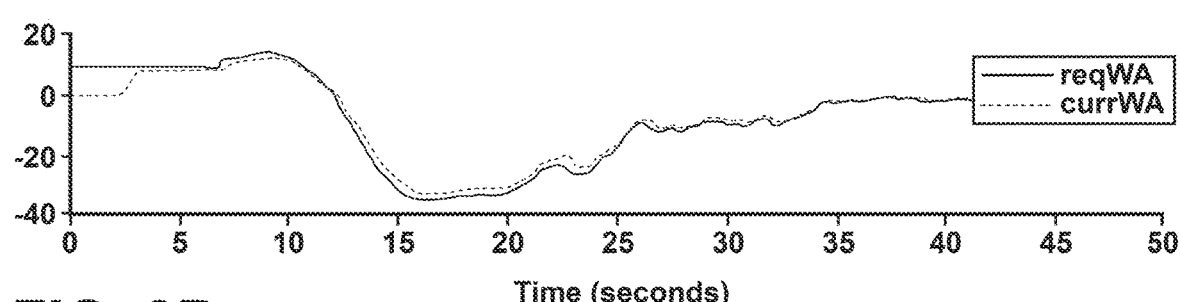

FIGS. 8A-8D illustrate graphs of vehicle data for a desired turn angle of 90 degrees, which corresponds to the reverse direction path 36 shown in FIG. 1. FIG. 8A shows a set or desired trailer angle (set TA) of about 40 degrees. At time 0 seconds, the trailer angle is 0 degrees, as the trailer 32 has about the same axis direction as the vehicle 30. FIG. 8B shows a desired vehicle steering angle (reqWA) of about 10 degrees. At start up or time 0, the vehicle steering angle is 0 degrees. At about 3 seconds, the actual steering wheel is automatically adjusted to about 10 degrees by the electronic steering wheel position controller 62 in response to the vehicle steering angle signal from the electronic processor 50. This adjustment is shown in FIG. 8B.

Figure 8C:
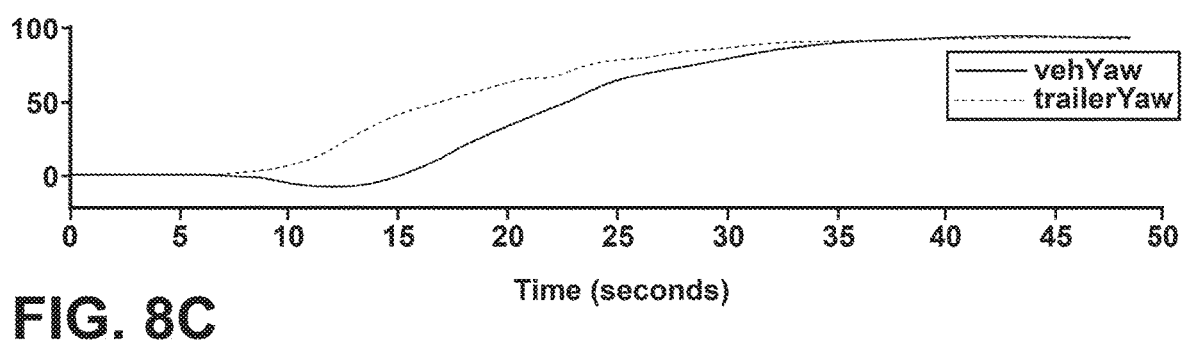
Figure 8D:
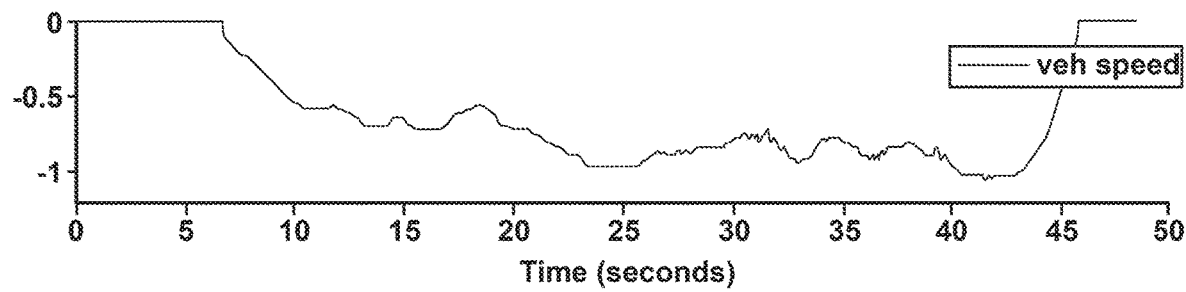

At about seven seconds time, a driver operates the vehicle in reverse at a negative speed as shown in FIG. 8D. At this time the trailer angle begins to increase as shown in FIG. 8A, the vehicle steering angle adjusts as shown in FIG. 8B, and the vehicle yaw angle and trailer yaw angle change as shown in FIG. 8C. After an increase in trailer angle shown in FIG. 8A, the steering angle is adjusted to a negative value between 10 and 15 seconds to return the turn angle to about 0 degrees with the vehicle 30 and trailer 32 in the position of 90 degrees from the starting position as shown in FIG. 1. At about 45 second time, the vehicle speed returns to zero as the maneuver along a steering path is complete.

90 Degree Desired Turn Angle at 10 Degree Trailer Angle Start

Figure 9A:
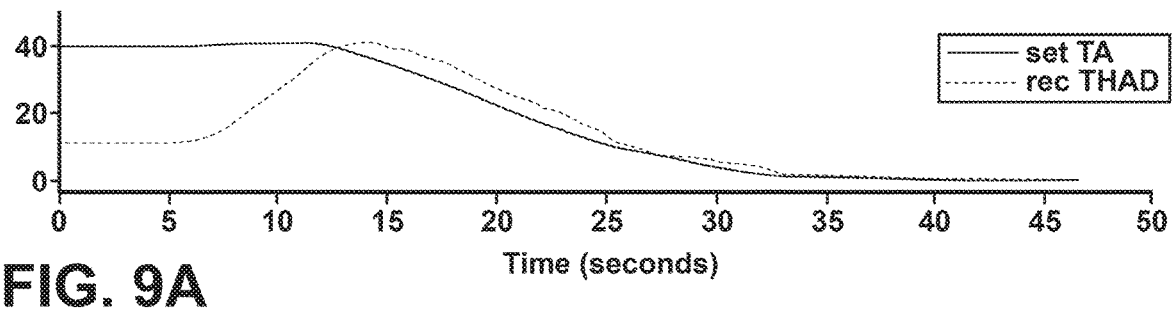
FIGS. 9A-9D illustrate graphs of vehicle data for a desired turn angle of 90 degrees with a ten degree trailer angle at start.
Figure 9B:
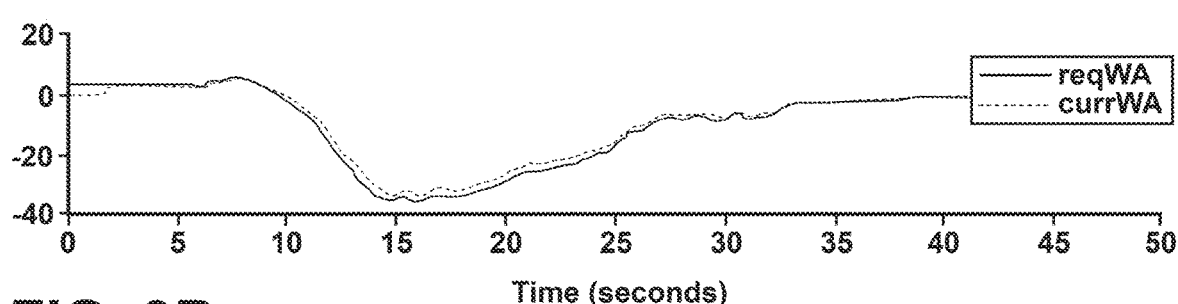
Figure 9C:
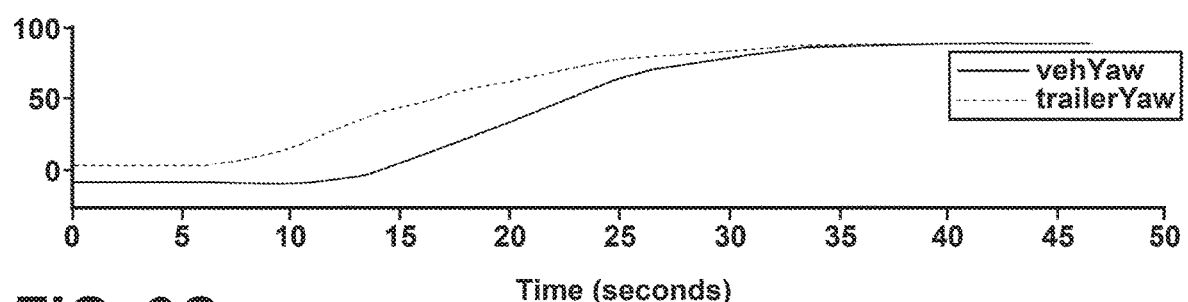
Figure 9D:
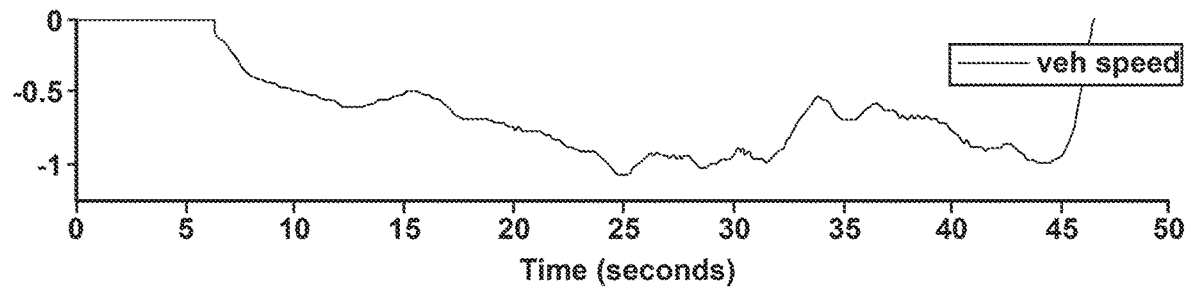

FIGS. 9A-9D illustrate graphs of vehicle data for a desired turn angle of 90 degrees with a ten degree trailer angle value at start. Thus, FIGS. 9A-9D are similar to FIGS. 8A-8D. One of the differences is the 10 degree starting trailer angle value at time 0 as shown in FIG. 9A. The vehicle steering angle adjusts as shown in FIG. 9B. FIG. 9C shows that the vehicle and trailer have different yaw angle values corresponding to the ten degree trailer angle. Of course, upon completion of the maneuver, the trailer angle is zero degrees.

While the electronic tow assist unit 44 is illustrated as a separate unit in FIG. 2, in some embodiments, the electronic tow assist unit is provided as an algorithm executed by a vehicle assist unit that performs other functions, such as collision avoidance warnings and lane change warnings.

Although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices or electronic processors 50 connected by one or more networks or other suitable communication means.

Various features, advantages, and embodiments are set forth in the following claims.

What is claimed is:

1. A trailer tow assist system for assisting in rearward maneuvering of a trailer attached to a vehicle, the trailer tow assist system comprising:
    a rear video camera for providing a rearward image of the trailer and surroundings;
    a vehicle interior display and an input device for selectively displaying a rearward image from the rear video camera, and the input device configured to receive inputs from a driver;
    a yaw angle determination device for determining a vehicle yaw angle of the vehicle;
    a steering angle sensor for sensing a vehicle steering angle of front wheels of the vehicle;
    a vehicle speed determination device for determining a vehicle speed of the vehicle; and
    an electronic processor and a memory, wherein when a trajectory mode and a desired turn angle are received from a driver, the electronic processor is configured to:
        determine a trailer angle for the trailer relative to the vehicle based upon video data received from the rear video camera;
        determine a trailer trajectory based on the desired turn angle value, the trailer angle, the vehicle yaw angle, and physical properties of the vehicle and the trailer;
        display the trailer trajectory on the vehicle interior display with the rearward image of the trailer and surroundings; and
    wherein when an automatic steering maneuver mode is selected by a driver, the electronic processor is configured to:
        provide an initial vehicle steering angle signal to a vehicle steering wheel position controller to position the vehicle steering angle of the vehicle for performing the trailer maneuvering operation corresponding to the desired turn angle value;
        upon rearward movement of the vehicle, updating the vehicle steering angle signal based on the desired turn angle value, the trailer angle, the vehicle speed, the vehicle yaw angle, and the physical properties of the vehicle and trailer, and
        provide the updated vehicle steering angle signal to the vehicle steering wheel position controller to control the vehicle steering angle to achieve the desired turn angle value with the vehicle and the trailer aligned after the maneuvering,
    wherein the electronic processor operates as a P-I-D cascade structure, and wherein a trailer angle error is determined in an inner loop and a vehicle yaw angle error is determined in an outer loop.

2. The trailer tow assist system according to claim 1, wherein the trailer angle error is determined more often than the vehicle yaw angle error.

3. The trailer tow assist system according to claim 1, wherein the trailer trajectory is a sharpest possible path going rearwardly a shortest possible distance and provide the desired turn angle value.

4. The trailer tow assist system according to claim 1, wherein the yaw angle determination device includes a gyro sensor, and a vehicle yaw rate is integrated over time to determine the vehicle yaw angle.

5. The trailer tow assist system according to claim 1, wherein the vehicle interior display and the input device are provided as a touchscreen disposed at a console in the vehicle interior.

6. The trailer tow assist system according to claim 1, wherein the physical properties of the vehicle and trailer include: vehicle wheelbase, vehicle overhang, maximum wheel angle, maximum wheel angle change rate, and trailer length.

7. A trailer tow assist system for assisting in rearward maneuvering of a trailer attached to a vehicle, the trailer tow assist system comprising:
    a rear video camera for providing a rearward image of the trailer and surroundings;
    a vehicle interior display and an input device for selectively displaying a rearward image from the rear video camera, and the input device configured to receive inputs from a driver;
    a yaw angle determination device for determining a vehicle yaw angle of the vehicle;
    a steering angle sensor for sensing a vehicle steering angle of front wheels of the vehicle;
    a vehicle speed determination device for determining a vehicle speed of the vehicle; and
    an electronic processor and a memory, wherein when a trajectory mode and a desired turn angle are received from a driver, the electronic processor is configured to:
        determine a trailer angle for the trailer relative to the vehicle based upon video data received from the rear video camera;
        determine a trailer trajectory based on the desired turn angle value, the trailer angle, the vehicle yaw angle, and physical properties of the vehicle and the trailer;
        display the trailer trajectory on the vehicle interior display with the rearward image of the trailer and surroundings; and
    wherein when an automatic steering maneuver mode is selected by a driver, the electronic processor is configured to:
        provide an initial vehicle steering angle signal to a vehicle steering wheel position controller to position the vehicle steering angle of the vehicle for performing the trailer maneuvering operation corresponding to the desired turn angle value;

upon rearward movement of the vehicle, updating the vehicle steering angle signal based on the desired turn angle value, the trailer angle, the vehicle speed, the vehicle yaw angle, and the physical properties of the vehicle and trailer, and provide the updated vehicle steering angle signal to the vehicle steering wheel position controller to control the vehicle steering angle to achieve the desired turn angle value with the vehicle and the trailer aligned after the maneuvering, wherein the displaying of the trailer trajectory path on the vehicle interior display with a rear image of the trailer and surroundings is provided by an overlay corresponding to the trailer trajectory for each of the wheels provided on the rear image on the vehicle interior display, and wherein in operation, a driver views the trailer trajectory on the vehicle interior display and manually moves the vehicle and the trailer to a location so that the trailer trajectory for each of the wheels leads to a desired area where a driver intends to maneuver the trailer to with the vehicle and the trailer oriented in alignment, and thereafter upon manual actuation of the tow assist system into an automatic steering maneuver mode, the electronic processor performs an automatic steering maneuver by updating the vehicle steering angle signal to the vehicle steering wheel position controller for the desired turn angle value.

8. The trailer tow assist system according to claim 7, wherein the trailer tow assist system provides a vehicle speed limit signal that prevents a driver operating the vehicle in the reverse direction from exceeding a vehicle speed limit.

9. The trailer tow assist system according to claim 7, wherein the trailer tow assist system is automatically disabled when the vehicle is shifted out of reverse gear.

10. A non-transitory computer readable medium including program instructions executed by an electronic processor for assisting in rearward maneuvering of a trailer attached to a vehicle along a trailer trajectory by:

determining a trailer angle for the trailer relative to the vehicle based upon video data received from a rear video camera;

receiving a vehicle yaw angle for the vehicle from a yaw angle determination device;

receiving a steering angle of front wheels of the vehicle;

receiving a vehicle speed of the vehicle; and performing a trailer steering maneuver along the trailer trajectory corresponding to a desired turn angle value by:

determining an initial vehicle steering angle signal based on the desired turn angle value, the trailer angle, the vehicle yaw angle, and physical properties of the vehicle and the trailer;

providing the initial vehicle steering angle signal to a vehicle steering wheel position controller to position the steering angle of the vehicle for performing the trailer steering maneuver corresponding to the desired turn angle value;

upon rearward movement of the vehicle, updating the vehicle steering angle signal based on the desired turn angle value, the trailer angle, the vehicle speed, the yaw, and the physical properties of the vehicle and the trailer, and providing the updated vehicle steering angle signal to the vehicle steering wheel position controller to automatically control the steering angle of the vehicle to maneuver the trailer along the trailer trajectory to achieve the desired turn angle value with the vehicle and the trailer aligned after the maneuvering, wherein a P-I-D cascade structure operates so that a trailer angle error is determined in an inner loop and a vehicle yaw angle error is determined in an outer loop.

\* \* \* \* \*